L. C. BYCK.
ENLARGING EASEL.
APPLICATION FILED JULY 12, 1919.
1,377,394.
Patented May 10, 1921.
2 SHEETS—SHEET 1.
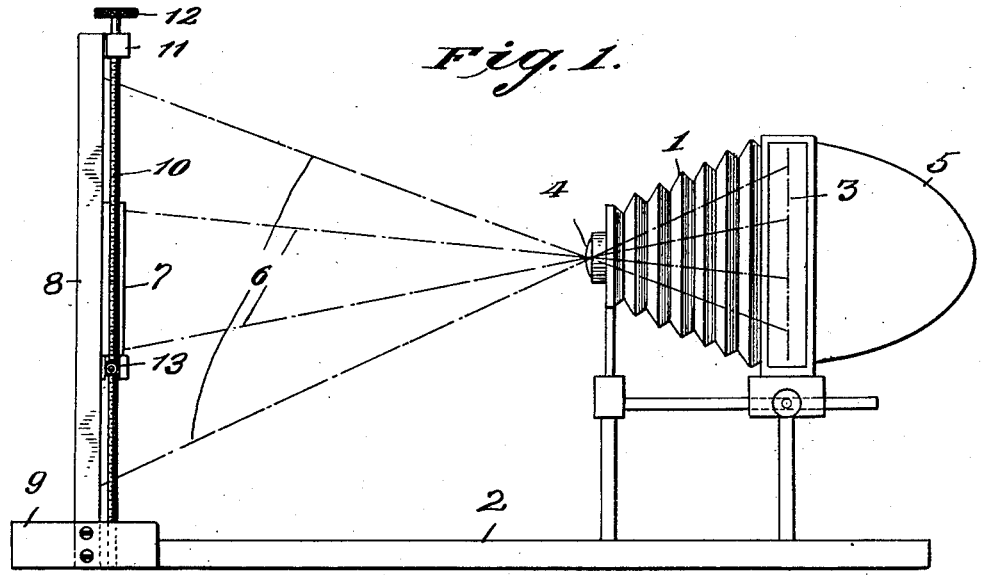
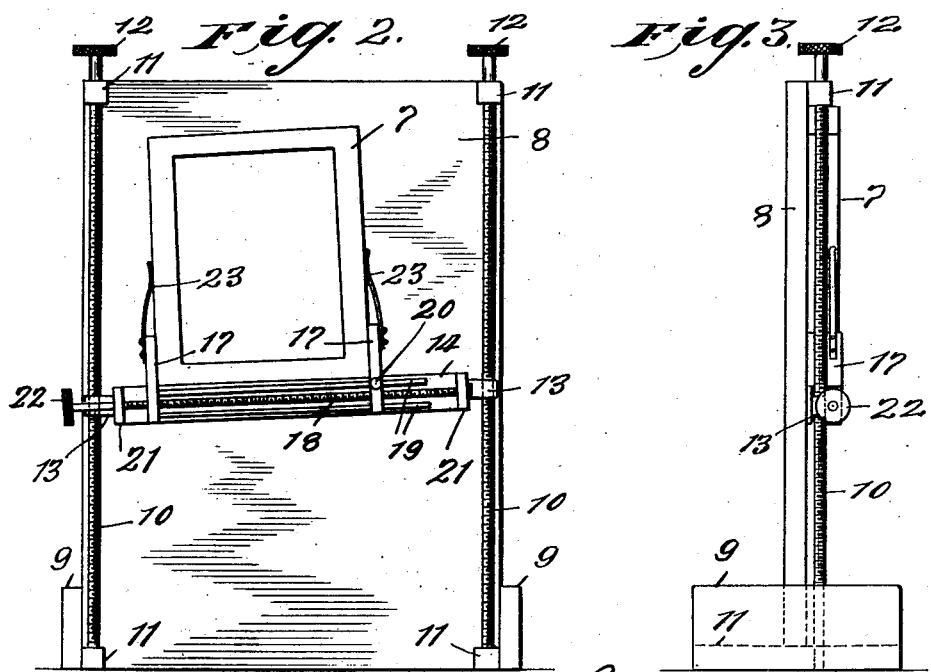

L. C. BYCK.
ENLARGING EASEL.
APPLICATION FILED JULY 12, 1919.
1,377,394.
Patented May 10, 1921.
2 SHEETS—SHEET 2.
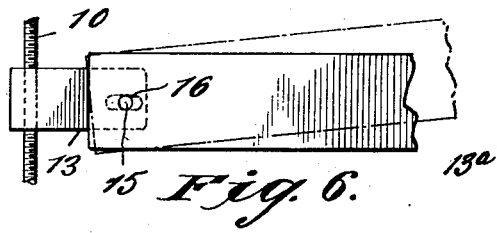
Fig. 6.
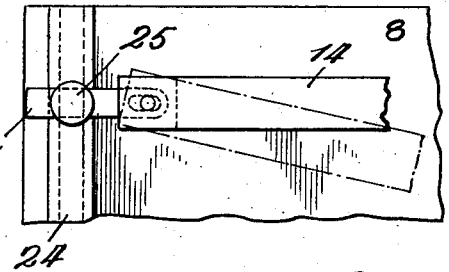
Fig. 7.
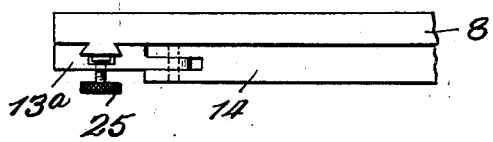
Fig. 8.
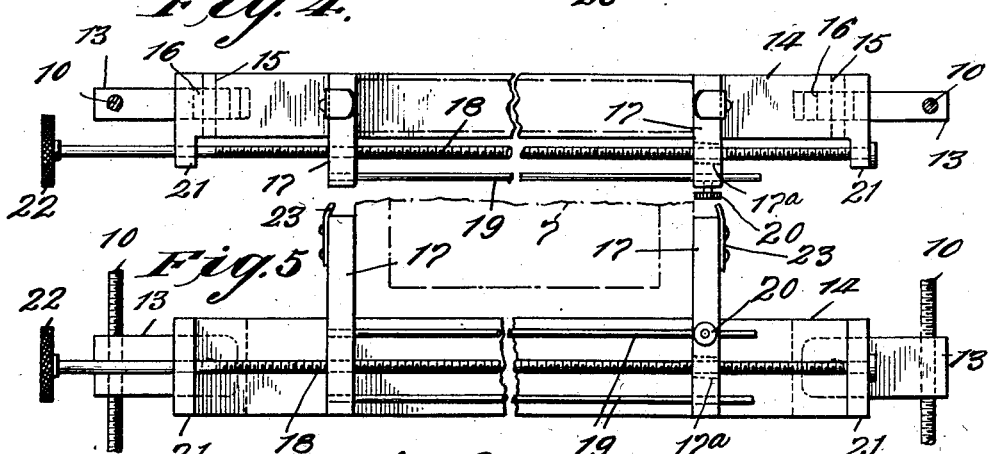
Fig. 4.
Fig. 5.
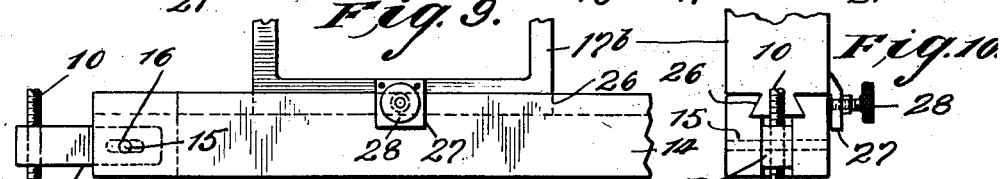
Fig. 9.
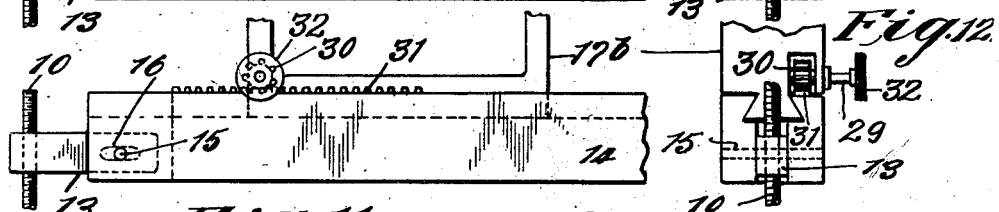
Fig. 10.
Fig. 11.
Fig. 12.
Lawrence C Byck INVENTOR
BY William P Hammond
ATTORNEY

UNITED STATES PATENT OFFICE.

LAWRENCE C. BYCK, OF PERTH AMBOY, NEW JERSEY.

ENLARGING-EASEL.

1,377,394.　　　　Specification of Letters Patent.　　Patented May 10, 1921.

Application filed July 12, 1919. Serial No. 310,468.

*To all whom it may concern:*

Be it known that I, LAWRENCE C. BYCK, a citizen of the United States, residing in Perth Amboy, in the county of Middlesex, State of New Jersey, have invented certain new and useful Improvements in Enlarging-Easels, of which the following is a specification.

The present invention relates to an improved easel, screen or support which is adapted for use in photographic enlarging, reducing, copying or other photographic processes, and has for its object to provide a device of this character which embodies novel features of construction whereby a plate holder, printing frame, or other suitable holder can be accurately positioned in the necessary manner to center the image and plumb the vertical lines of a picture preparatory to making an exposure.

Further objects of the invention are to provide a device of this character which can be easily and quickly adjusted, which can be used to support either a large or a small holder or frame, and which will save time and trouble in making photographic enlargements, prints of reduction, lantern slides or transparencies by enlargement or reduction, enlarged or reduced negatives on glass or paper, and enlarged or reduced copies on glass or paper.

With these and other objects in view, the invention consists in certain novel combinations and arrangements of the parts as will more fully appear as the description proceeds, the novel features thereof being pointed out in the appended claims.

For a full understanding of the invention, reference is to be had to the following description and accompanying drawings, in which :—

Figure 1 is a side elevation of an enlarging camera and an easel which is constructed in accordance with the invention.

Fig. 2 is a front elevation of the easel with a printing frame supported in position thereon.

Fig. 3 is an edge view of the same.

Fig. 4 is a top plan view of the transverse supporting bar and the printing frame engaging slide which is adjustable longitudinally thereon, portions being broken away.

Fig. 5 is a front elevation of the same.

Fig. 6 is a detail view of one end of the transverse bar, showing the pin and slot connection between the bar and one of the end blocks.

Figs. 7 and 8 are detail views showing a modification in which dove-tail ribs are substituted for the upright threaded rods at opposite sides of the easel.

Figs. 9 and 10 are detail views showing a further modification in which the printing frame engaging slide has a dove-tail connection with the transverse supporting bar.

Figs. 11 and 12 are detail views showing a further modification in which a rack and pinion arrangement is provided for adjusting the slide on the transverse bar.

Corresponding and like parts are referred to in the following description and indicated in all the views of the drawings by the same reference characters.

Referring to the drawings, the numeral 1 designates a conventional enlarging camera which is mounted to slide back and forth upon the track 2, said camera receiving the negative or member to be enlarged at 3, and being provided with the usual lens 4. The source of light is housed within a parabolic reflector 5 at the back of the camera. The path of the light rays is indicated by the dot and dash lines 6, and the sensitized paper or plate upon which the enlargement is to be made is carried by a printing frame 7 which is supported upon the easel in the proper position to center the image thereon in the desired manner. The camera and printing frame are of the conventional construction, and the invention resides in the construction of the easel which is employed for supporting the printing frame in exactly the desired position and at the desired angle upon the easel.

The upright back 8 of the easel is arranged in front of the camera, being shown as provided at its bottom portion with feet 9 for holding it in a vertical position. Vertically disposed threaded guide rods 10 are provided at opposite sides of the back 8, being journaled in lugs 11 which project from the back at the top and bottom thereof, and being provided at their upper ends with finger pieces 12 by means of which they can be readily rotated. Blocks 13 are adjustably mounted upon the threaded rods 10, having a threaded engagement therewith so that by rotating the rods the blocks can be moved up and down. These blocks support a transverse bar 14 which extends across the front of the easel, and are loosely connected to the bar so that by positioning the blocks at different elevations the bar can be held in a tilted position, as indicated by Fig. 2. One of the blocks 13 is shown as pivotally connected at 15 to the corresponding end of the bar 14, while the other block 13 has a pin and slot connection 16 with the opposite end of the bar. This form of connection between the bar and the block enables the bar to be drawn into an angular position without any binding or straining of the connections and, at the same time, the bar is held firmly so that there is no looseness to interfere with the proper taking of the picture.

A slide is mounted upon the transverse bar 4 and includes a pair of complemental members 17 which extend upwardly above the bar and are adapted to receive the lower edge of the printing frame 7 between the same. A threaded adjusting shaft 18 which extends across the front of the bar 14 passes through the two slide elements 17, one of the said elements having a threaded engagement with the rod, while the other element is formed with an opening 17a which is of sufficient size to clear the rod. The slide element 17 which has a threaded engagement with the adjusting rod 18 is provided with a pair of lateral arms 19 which pass loosely through openings in the other slide element 17, one of the said lateral arms being engaged by a set screw 20 which provides for locking the slide elements 17 in any desired spaced relation. When the two slide elements are thus locked together it will be obvious that they can be moved simultaneously and adjusted to any desired position upon the transverse bar 14 by rotating the threaded adjusting rod 18. This rod is journaled in bearings 21 projecting forwardly from the ends of the transverse bar 14, and is provided at one extremity with a finger piece 22, by means of which it can be rotated to move the slide back and forth upon the bar. The lower end of the printing frame 7 is intended to be received between the slide elements 17, and said elements are provided with upwardly extending spring arms 23 which grip the printing frame and hold it detachably in position. It will be understood, however, that the printing frame can be readily removed from the easel and again replaced in exactly the same position from which it was taken.

A slight modification is shown by Figs. 7 and 8 in which the easel back 8 is provided at the sides thereof with outstanding dove-tail ribs 24 which are substituted for the upright threaded rods 10 in the previously described construction. The blocks 13a carry the transverse bar 14, exactly as in the previous instance, but are provided with dove-tail grooves to receive the dove-tail ribs 24, and carry set screws 25 by means of which they can be locked in adjusted positions.

A further modification is illustrated by Figs. 9 and 10, in which the printing frame receiving slide 17b has a dove-tail tongue and slot connection 26 with the upper edge of the transverse bar 14, so that it is held in position upon the bar, although it can be readily moved back and forth thereon. A wing 27 extends downwardly from the slide over the front of the transverse bar and is provided with a set screw 28 by means of which the slide can be readily locked in an adjusted position.

A further modification is shown by Figs. 11 and 12, in which the printing frame receiving slide 17b has a rack and pinion connection with the transverse bar 14 for convenience in accurately positioning the frame upon the bar. A short shaft 29 is shown as journaled in the slide and provided with a pinion 30 which meshes with a rack 31 on the transverse bar. A finger piece 32 at the outer end of the short shaft provides for rotating the pinion to move the slide back and forth upon the transverse bar and position it thereon in the desired manner.

In all of the forms of the invention means is provided for supporting the printing frame in such a manner that it can not only be adjusted both vertically and laterally, but can also be tilted into an angular position, this being very frequently necessary in order to center the image upon the sensitized paper or plate in the necessary manner. Furthermore the printing frame is detachably engaged by the slide and can be readily removed therefrom and again replaced in the exact position from which it was taken. The desired adjustment can be quickly made, and printing frames of different sizes can be employed, the slide elements being readily adjustable toward and away from each other to receive smaller or larger printing frames.

The apparatus can be used either as a separate unit or as part of a complete unit in connection with any of the well-known projection or copying cameras, and it will be obvious that the easel or screen can be used to support a print or picture of which a reproduction is to be made by the camera, the light source being external to the camera and the image of the picture being projected by the lens upon the sensitized surface in the camera. A plate, film, sensitized paper, or other suitable medium may be utilized to reproduce the projected image, and it is immaterial to the invention whether the copy is positive or negative, or also whether enlarged, reduced, or the same size as the original, so long as it is made by projection. The easel may be mounted to slide upon tracks, or may have trucks attached to it upon which the projection or carrying camera is adapted to slide, or it may be an entirely separate unit. The outfit may be adapted to take only the largest size holder, and the usual "kits" or masks or the like may be utilized for supporting smaller size papers or plates, or the device may be made adjustable to take any size holder or frame from the smallest to the largest. The adjustments and the exact method of constructing the device may vary with the results desired. They may be made as merely sliding movements capable of being clamped in position, where cheapness of construction and ease of operation are of more importance than extreme accuracy, or may be made with a screw, rack and pinion, or other mechanical movement where more refined work is undertaken, and accuracy is of the most importance. It will be understood that I do not restrict myself to the exact details of construction which I have illustrated and described, but that numerous changes and modifications can be made without departing from the scope of the invention as defined by the allowed claims.

Having thus described the invention, what I claim as new and desire to secure by Letters Patent, is:—

1. A printing frame support including an upright back, a bar extending across the face of the back, means for adjusting the bar vertically and for tilting it in a vertical plane, a slide adjustable longitudinally on the bar, and means on the slide for detachably engaging and positioning a printing frame.

2. A printing frame support, including an upright frame, a bar extending across the face of the frame, means for adjusting the bar vertically and for tilting it in a vertical plane, a slide adjustable longitudinally upon the bar, and resilient arms upon the slide for detachably engaging a printing frame.

3. A printing frame support including an upright frame, a transverse bar extending across the face of the frame, means for adjusting the bar vertically and for tilting it in a vertical plane, a slide adjustable longitudinally upon the bar and providing positioning means to removably receive a printing frame, and resilient arms upon the slide for holding the printing frame detachably in position.

4. A printing frame support, including an upright back, a bar extending across the face thereof, means for adjusting the bar vertically and for tilting it in a vertical plane, a slide adjustable longitudinally upon the bar and formed with two elements adapted to receive a printing frame between the same, and means for adjusting the spacing of the elements for different sizes of printing frames.

5. A printing frame support, including an upright back, a bar extending transversely across the face of the back, means for adjusting the bar vertically and for tilting it in a vertical plane, a slide adjustable longitudinally on the bar and formed with spaced elements adapted to receive a printing frame between the same, means for adjusting the spaced elements to receive a large or small printing frame, and resilient arms carried by the elements for gripping the printing frame.

6. A printing frame support, including an upright back, a bar extending transversely across the face of the back, means for adjusting the bar vertically and also swinging it into angular positions in a vertical plane, and a printing frame support carried by the bar.

7. A printing frame support, including an upright back, a pair of upright guides at opposite sides thereof, independently adjustable blocks movable up and down upon the guides, a transverse bar supported at its ends by the blocks, and a printing frame supporting slide adjustable longitudinally upon the bar.

8. A printing frame support, including an upright back, a pair of parallel upright guides at opposite sides of the back, independently adjustable blocks movable up and down on the guides, a transverse bar supported at its ends by the blocks and loosely connected thereto, a slide adjustable longitudinally upon the transverse bar, and a printing frame positioning and engaging means upon the slide.

9. A printing frame support, including an upright back, a pair of threaded guide rods journaled at opposite sides of the back and arranged in a parallel relation, blocks mounted upon the guide rods and having a threaded engagement therewith, a transverse bar loosely connected at its ends to the blocks, means for rotating the guide rods independently of each other to adjust the position and angular relation of the transverse bar, and a printing frame positioning slide adjustable longitudinally upon the transverse bar.

10. A printing frame support including an upright back, a pair of upright threaded guide rods journaled at opposite sides thereof, blocks having a threaded engagement with the upright rods and adjustable thereon, a transverse bar loosely connected at its ends to the blocks, means for independently rotating the rods to adjust the position and inclination of the transverse bar, a printing frame engaging slide mounted upon the transverse bar, and a threaded adjusting rod journaled upon the transverse bar and engaging the slide for moving the slide upon the bar.

11. A support of the character described, including an upright back, a bar extending transversely across the face of the back, means for adjusting the bar vertically and also swinging it into angular positions in a vertical plane, and means carried by the bar and constructed to support an object to be positioned upon the back.

12. A support of the character described, including an upright back, a bar extending across the face thereof, means for adjusting the bar vertically and for tilting it in a vertical plane, a slide adjustable longitudially upon the bar and including two spaced elements, and means for adjusting the spacing of the elements to receive different sizes of objects which are to be supported and positioned against the back.

13. A support of the character described, including an upright back, a pair of upright guides at opposite sides thereof, independently adjustable blocks movable up and down upon the guides, a transverse bar supported at its ends by the blocks, and a slide adjustable longitudinally upon the bar and adapted to support an object which is to be positioned against the back.

14. A support of the character described, including an upright back, a pair of parallel upright guides at opposite sides of the back, independently adjustable blocks movable up and down on the guides, a transverse bar supported at its ends by the blocks and loosely connected thereto, a slide adjustable longitudinally upon the transverse bar and formed with spaced elements, and means for adjusting the spacing of the elements to receive a large or small object which is to be positioned against the back.

LAWRENCE C. BYCK.